July 23, 1929.    F. J. WESTON    1,721,723

VALVE LIFTER

Filed Feb. 28, 1928

INVENTOR.
F. J. Weston
BY
ATTORNEY.

Patented July 23, 1929.

1,721,723

UNITED STATES PATENT OFFICE.

FREDERICK J. WESTON, OF DENVER, COLORADO, ASSIGNOR OF ONE-HALF TO MACK PARKER, OF EDGEWATER, COLORADO.

VALVE LIFTER.

Application filed February 28, 1928. Serial No. 257,626.

This invention relates to valve lifters of the type used for the purpose of removing valves of internal combustion engines by compression of the coiled springs that hold the valves to their seats and subsequent withdrawal of the pins on which the springs are supported.

It is an object of the invention to provide a tool of the above described character which combines simplicity of construction with practicability and efficiency in use.

Another object is to provide certain new and useful adjustments to adapt the tool for use under variant conditions, a further object is to provide a valve lifter of more compressing power than is usual in tools of this kind and still other objects reside in details of construction and new and useful arrangements and combinations of parts as described hereinafter and as shown in the accompanying drawings.

Figure 1:
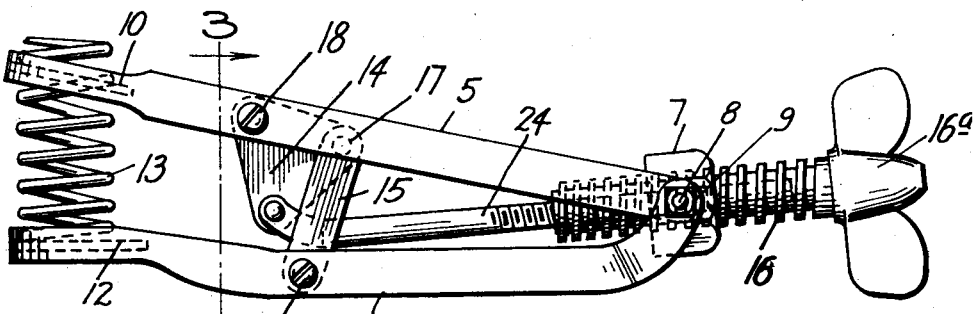
Figure 2:
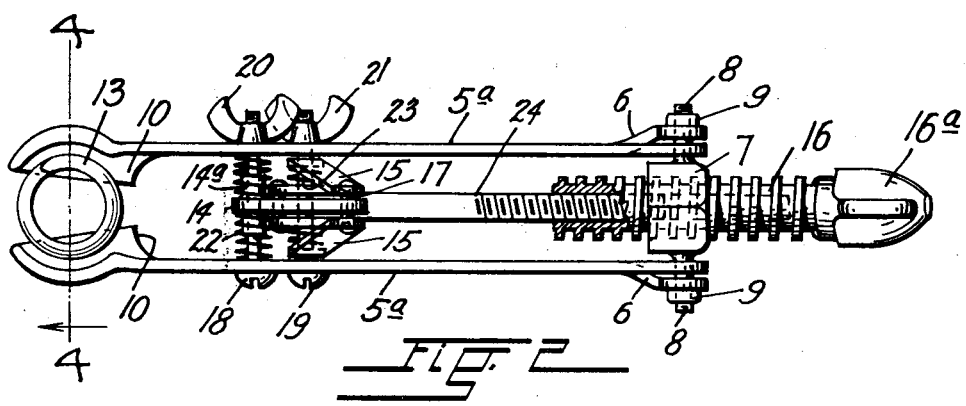
Figure 4:
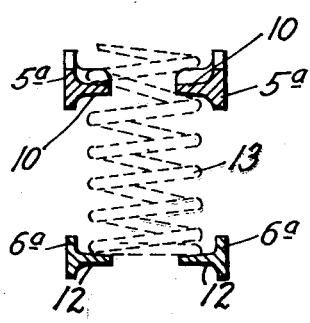
Figure 3:
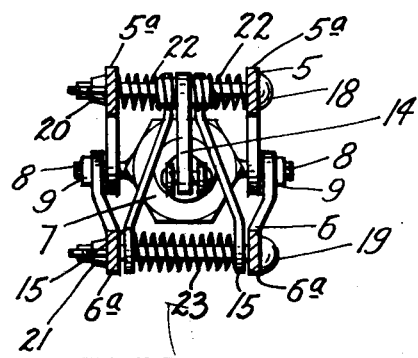

In the drawings in which like reference numerals designate corresponding parts throughout the views, Figure 1 represents a side view of the valve lifter in its operative position relative to a valve spring, Figure 2, a top view of the tool shown in Figure 1, Figure 3, a section along the line 3—3 Figure 1, and Figure 4, a section taken on the line 4—4, Figure 2.

Referring further to the drawings, the tool comprises two jaws 5 and 6 each composed of two separate members indicated at 5ª and 6ª and fulcrumed at opposite sides of a block 7 by means of trunnions 8 at opposite sides thereof. The trunnions are screw-threaded at their ends and the jaw members are held in place by nuts 9 screwed on said ends.

The jaw members are flattened at their free ends to provide lips 10 and 12 for engagement with the valve springs 13 the lips 10 being preferably formed mediate of the edges of the members as best shown in Figure 4, so that they may engage the spring coils at either side thereof.

A toggle system consisting of a triangular lever or bell crank 14 and links 15 is employed to force the jaws apart or together by the operation of a screw 16 working in a correspondingly screw-threaded opening of the block 7. The bell crank and the two links are pivoted together as at 17; the lever is at another corner pivotally connected with the members 5ª of the jaw 5 by means of a headed bolt 18 and the links are pivoted between the members of the other jaw by a headed bolt 19.

The bolts are threaded and wing nuts 20 and 21 screwed upon the bolts determine the distance at which the members of the jaws are held apart. Springs 22 and 23 coiled around the bolts at opposite sides of the triangular lever and between the links, yieldingly hold the jaw members in contact with the heads and the nuts of the respective bolts. The bell crank is provided with a sleeve 14ª to provide a bearing for the bolt 18.

The triangular lever is at its third corner connected with the screw 16 by means of a pivoted rod 24. The rod has a screw thread of opposite slant from that on the screw and the latter has an axial bore screw-threaded for cooperation with the thread of the rod.

In the operation of the tool the jaws are placed with the lips at the free ends of their members in engagement with coils of the valve spring 13 or with a coil of the spring and a relatively stationary part of the engine, as the case may be.

The spring is compressed by forcing the free ends of the jaws together by rotation of the screw 16 which to facilitate manipulation, has been provided with a winged head 16ª. Rotation of the screw to the right causes it to advance outwardly from the block and at the same time causes the rod 24 to move in the same direction with the result that the action of the screw upon the triangular lever is multiplied in speed as well as in force.

The pivotal motion imparted to the bell crank lever, brings the ends of the lever and the links at which they are pivoted to the jaw-members, together with the result that the spring engaged by the lips at the outer ends of the jaws as stated hereinbefore, is compressed.

The spring is released by turning the screw in the opposite direction. It will be apparent that the screw means by which the toggle movement is operated provides a positive lock that holds the jaws in any position to which they are adjusted.

The screw-threaded bolts, the nuts and the springs provide for adjusting the members of the jaws laterally so that their ends may be spread apart or brought together according to the size of the spring or other object to which the tool is applied.

It is to be understood that the tool may be employed as a vise or clamp for purposes other than contracting valve springs and that changes in minor details of construction may be resorted to within the spirit of the invention.

I claim:

1. A valve lifter comprising fulcrumed jaws, lever mechanism for moving the jaws about their fulcrum, and operating means including a screw-threaded block, a therewith cooperative screw having a female thread slanting opposite to the thread of the block and a screw-rod cooperating with the female thread and connected with the mechanism.

2. A valve lifter comprising a screw-threaded block, jaws fulcrumed on the block, lever mechanism for moving the jaws about their fulcrum, and operating means including a screw cooperating with the screw thread of the block and having a second screw-thread of opposite slant, and a screw rod cooperating with the second screw thread and connected with the mechanism.

3. A valve lifter comprising fulcrumed jaws each composed of two members, mechanism for moving the jaws about their fulcrum, including pivoted toggle parts, screw-threaded bolts pivotally connecting the toggle parts with the jaws, nuts on the bolts to vary the distance between the members of the jaws, springs on the bolts to yieldingly hold the jaw members apart, and means for operating the mechanism.

4. A valve lifter comprising fulcrumed jaws each composed of two members, mechanism for moving the jaws about their fulcrum, including a bell crank and two links pivoted together, screw-threaded bolts pivoting the bell crank and the links between the members of the jaws, nuts on the bolts to vary the distance between the members of the jaws, springs on the bolts, at opposite sides of the bell crank and between the links to yieldingly hold the jaw members apart, and operating means for the mechanism.

5. A valve lifter comprising a screw-threaded block, jaws each composed of two members fulcrumed on the block, mechanism for moving the jaws about their fulcrum, including a bell crank and a link element pivoted together and pivoted to and between the jaw members, and an operating element including a screw cooperating with the screw thread of the block and having another screw thread of opposite slant, and a screw-threaded rod cooperating with said other screw thread and pivotally connected with the bell crank.

6. A valve lifter comprising a screw-threaded block, jaws fulcrumed on the block, mechanism for moving the jaws about their fulcrum, including a bell crank and a link element pivoted together and pivoted to the jaws, and an operating element including a screw cooperating with the screw thread of the block and having another screw thread of opposite slant, and a screw-threaded rod cooperating with said other screw thread and pivotally connected with the bell crank.

In testimony whereof I have affixed my signature.

FREDERICK J. WESTON.